US012444309B2

(12) United States Patent
Adachi

(10) Patent No.: US 12,444,309 B2
(45) Date of Patent: Oct. 14, 2025

(54) INFORMATION PROCESSING APPARATUS AND INFORMATION PROCESSING METHOD

(71) Applicant: KDDI CORPORATION, Tokyo (JP)

(72) Inventor: Takashi Adachi, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 328 days.

(21) Appl. No.: 18/107,665

(22) Filed: Feb. 9, 2023

(65) Prior Publication Data

US 2024/0105061 A1    Mar. 28, 2024

(30) Foreign Application Priority Data

Sep. 28, 2022  (JP) .................................. 2022-155396

(51) Int. Cl.
*G08G 5/26* (2025.01)
*H04B 7/185* (2006.01)

(52) U.S. Cl.
CPC ........... *G08G 5/26* (2025.01); *H04B 7/18506* (2013.01)

(58) Field of Classification Search
CPC .................................. G08G 5/80; G08G 7/02
See application file for complete search history.

(56) References Cited

U.S. PATENT DOCUMENTS

| | | | |
|---|---|---|---|
| 9,139,529 B2* | 9/2015 | Hadida-Ruah | A61P 19/00 |
| 2018/0253978 A1* | 9/2018 | Tabuchi | G08G 5/55 |
| 2019/0090141 A1* | 3/2019 | Fujii | H04W 16/14 |
| 2020/0351901 A1* | 11/2020 | Kahn | H04W 48/18 |
| 2021/0053673 A1 | 2/2021 | Kanda | |
| 2023/0237917 A1* | 7/2023 | Schuppenhauer | G08G 5/26 |
| | | | 701/120 |

FOREIGN PATENT DOCUMENTS

JP    2019-207556 A    12/2019

* cited by examiner

*Primary Examiner* — Kenneth J Malkowski
(74) *Attorney, Agent, or Firm* — Foley & Lardner LLP

(57) ABSTRACT

A flight management server having an assessment unit that assesses whether or not there will be a requirement to switch communication performed by a first flying vehicle during flight between terrestrial communication and satellite communication; and a determination unit that determines a detection range for providing a report in response to detection of a second flying vehicle different from the first flying vehicle, the detection range being defined with respect to a position of the first flying vehicle; wherein the determination unit makes the detection range for a case in which the assessment unit has assessed that there will be a requirement to switch between the terrestrial communication and the satellite communication larger than the detection range for a case in which the assessment unit has assessed that there will be no requirement to switch between the terrestrial communication and the satellite communication.

9 Claims, 7 Drawing Sheets

INFORMATION PROCESSING APPARATUS AND INFORMATION PROCESSING METHOD

CROSS REFERENCE TO RELATED APPLICATION

Priority is claimed on Japanese Patent Application No. 2022-155396, filed Sep. 28, 2022, the content of which is incorporated herein by reference.

BACKGROUND OF THE INVENTION

Field of the Invention

The present invention relates to an information processing apparatus and an information processing method for processing information relating to a flying vehicle.

Description of Related Art

Patent Document 1 (Japanese Unexamined Patent Application, First Publication No. 2019-207556) discloses a method that, in response to the distance from a flying vehicle to another flying vehicle becoming a prescribed distance or less, makes the flying vehicle perform actions to avoid the other flying vehicle.

SUMMARY OF THE INVENTION

Therefore, an example of an objective of the present invention is to be able to prevent situations in which a flying vehicle coming near another flying vehicle cannot be detected, even in cases in which the flying vehicle switches communication means between terrestrial communication and satellite communication.

An information processing apparatus according to a first aspect of the present invention has an assessment unit that assesses whether or not there will be a requirement to switch communication performed by a first flying vehicle during flight between terrestrial communication using terrestrial communication equipment and satellite communication using a communication satellite; and a determination unit that determines a detection range for providing a report in response to detection of a second flying vehicle different from the first flying vehicle, the detection range being defined in with respect to a position of the first flying vehicle; wherein the determination unit makes the detection range for a case in which the assessment unit has assessed that there will be a requirement to switch between the terrestrial communication and the satellite communication larger than the detection range for a case in which the assessment unit has assessed that there will be no requirement to switch between the terrestrial communication and the satellite communication.

The assessment unit may assess whether or not there will be a requirement to switch between the terrestrial communication and the satellite communication based on whether or not the position of the first flying vehicle is within a region in which a radio signal strength of signals for the terrestrial communication is within a prescribed range.

The assessment unit may assess whether or not there will be a requirement to switch between the terrestrial communication and the satellite communication based on a relationship between a threshold value and a radio signal strength of signals for the terrestrial communication received by the first flying vehicle.

The information processing apparatus may further have a reporting unit that, on the condition that the second flying vehicle is positioned within the detection range, transmits, to an information terminal used by a user associated with the second flying vehicle, information indicating that the first flying vehicle and the second flying vehicle are approaching near to each other.

The information processing apparatus may further have a reporting unit that, on the condition that the second flying vehicle is positioned within the detection range, transmits, to the second flying vehicle, information for making the second flying vehicle fly without coming into contact with the first flying vehicle.

The determination unit may set the detection range to be a range within a first distance from the position of the first flying vehicle in a case in which the assessment unit has assessed that there will be no requirement to switch between the terrestrial communication and the satellite communication, and may set the detection range to be a range within a second distance, greater than the first distance, from the position of the first flying vehicle in a case in which the assessment unit has assessed that there will be a requirement to switch between the terrestrial communication and the satellite communication.

The determination unit may, after having made the detection range larger in response to the assessment unit having assessed that there will be a requirement to switch between the terrestrial communication and the satellite communication, return the detection range to that for the case in which the assessment unit has assessed that there will be no requirement to switch between the terrestrial communication and the satellite communication in response to the communication performed by the first flying vehicle having been switched between the terrestrial communication and the satellite communication.

The information processing apparatus may further have a reporting unit that, in response to the communication performed by the first flying vehicle having been switched between the terrestrial communication and the satellite communication, transmits, to an information terminal used by a user associated with the first flying vehicle, information indicating that the communication performed by the first flying vehicle has been switched between the terrestrial communication and the satellite communication.

The information processing apparatus may further have a switching control unit that controls switching of the communication performed by the first flying vehicle between the terrestrial communication and the satellite communication on the condition that a relationship between a threshold value and a radio signal strength of signals for the terrestrial communication received by the first flying vehicle has satisfied a switching criterion.

An information processing method according to a second aspect of the present invention, executed by a processor, includes assessing whether or not there will be a requirement to switch communication performed by a first flying vehicle during flight between terrestrial communication using terrestrial communication equipment and satellite communication using a communication satellite; and determining a detection range for providing a report in response to detection of a second flying vehicle different from the first flying vehicle, the detection range being defined with respect to a position of the first flying vehicle; wherein the determining includes making the detection range for a case in which it is assessed that there will be a requirement to switch between the terrestrial communication and the satellite communication in the assessing, larger than the detection range for a case in which it is assessed that there will be no requirement to switch between the terrestrial communication and the satellite communication in the assessing.

DETAILED DESCRIPTION OF THE INVENTION

[Outline of Flight Management System S]

Figure 1:
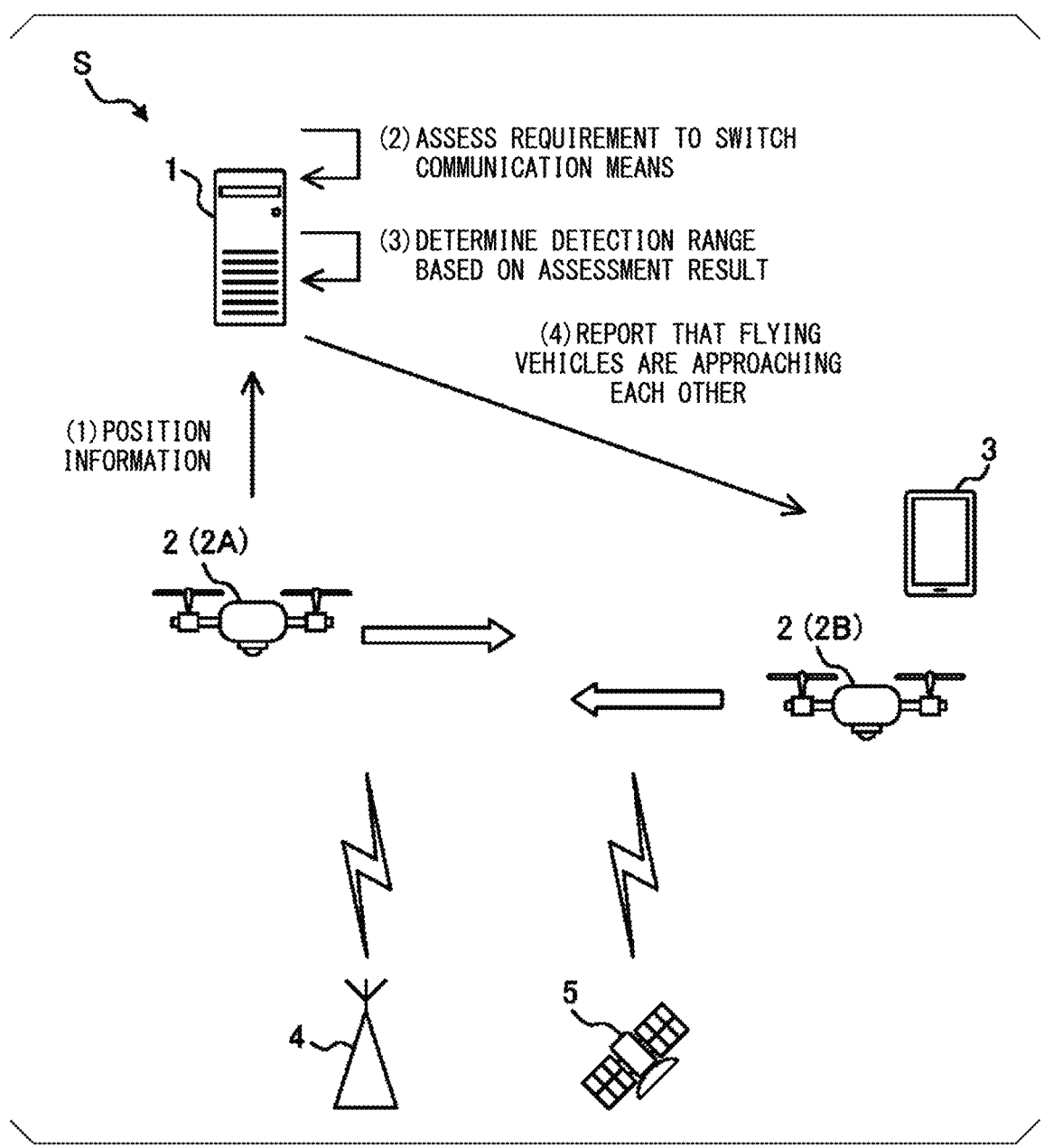
FIG. 1 is a schematic diagram of a flying vehicle management system according to the present embodiment.

FIG. 1 is a schematic diagram of a flight management system S according to the present embodiment. The flight management system S includes a flight management server 1, multiple flying vehicles 2, and an information terminal 3. The flight management system S may include other terminals, apparatuses, or the like.

The flight management server 1 is a computer for managing information relating to the flight of the flying vehicles 2. The flight management server 1 is a single computer or multiple computers. Additionally, the flight management server 1 may be one or multiple virtual servers that operate on a cloud, which is a set of computer resources.

The flying vehicles 2 are unmanned flying apparatuses, such as drones, that fly in the air. Additionally, the flying vehicles 2 may be manned flying apparatuses such as aircraft or flyable cars. The flying vehicles 2 have communication units for transmitting and receiving information, by radio communication, to and from the flight management server 1, via prescribed communication means. The flying vehicles 2 can switch the communication means used during flight between terrestrial communication making use of terrestrial communication equipment 4, and satellite communication making use of a communication satellite 5.

The communication equipment 4 is, for example, a terrestrially installed base station that relays communication signals transmitted respectively by the flight management server 1 and the flying vehicles 2. The communication equipment 4 supports communication standards such as 3G (Generation), 4G/LTE (Long-Term Evolution), 5G, etc. The communication satellite 5 is an artificial satellite located in outer space, for relaying communication signals transmitted, for example, by the flight management server 1 and the flying vehicles 2 respectively. The communication satellite 5 supports a prescribed satellite communication standard.

The information terminal 3 is a computer used by a user. The information terminal 3 is, for example, an information terminal such as a smartphone, a tablet terminal or a personal computer.

The user is, for example, a manual operator who is manually operating a flying vehicle 2. Additionally, the user may be a manager (operator, etc.) managing the flight of multiple flying vehicles 2.

The information terminal 3 has a display unit, such as a liquid crystal display, for displaying information, and a manual operating unit, such as a touch panel, for receiving manual operations by a user. The information terminal 3 transmits and receives information to and from the flight management server 1 by communication.

An outline of the process executed by the flight management system S according to the present embodiment will be explained below. The flight management server 1 acquires position information indicating the position of each of multiple flying vehicles 2 that are flying ((1) in FIG. 1).

The flight management server 1 assesses whether or not there will be a requirement to switch the communication performed by a first flying vehicle 2A among the multiple flying vehicles 2 between terrestrial communication and satellite communication ((2) in FIG. 1). The flight management server 1 assesses whether or not there will be a requirement to switch between terrestrial communication and satellite communication based on the radio signal strength at the position of the first flying vehicle 2A on a radio signal map or the radio signal strength of communication signals received by the first flying vehicle 2A.

The flight management server 1 determines, based on the assessment results regarding whether or not there will be a requirement to switch the communication performed by the first flying vehicle 2A, a detection range for detecting that a second flying vehicle 2B different from the first flying vehicle 2A will approach near to the first flying vehicle 2A ((3) in FIG. 1). In this case, the flight management server 1 sets the detection range for the case of an assessment that there will be a requirement to switch the communication performed by the first flying vehicle 2A to be larger than the detection range for the case of an assessment that there will be no requirement to switch the communication performed by the first flying vehicle 2A.

The flight management server 1 reports that the second flying vehicle 2B is approaching near to the first flying vehicle 2A on the condition that the second flying vehicle 2B is positioned within the determined detection range ((4) in FIG. 1). The flight management server 1 may, for example, transmit, to the information terminal 3 that is being used by a user, such as a manual operator or a manager, associated with the second flying vehicle 2B, information indicating that the first flying vehicle 2A and the second flying vehicle 2B will approach near to each other. Additionally, the flight management server 1 may, for example, transmit, to the second flying vehicle 2B, information for making the second flying vehicle 2B fly without coming into contact with the first flying vehicle 2A.

In this way, the flight management system S makes the detection range for detecting that the first flying vehicle 2A and the second flying vehicle 2B are approaching near to each other larger in the case in which there will be a requirement to switch the communication performed by the first flying vehicle 2A between terrestrial communication and satellite communication. Thus, even in cases in which the first flying vehicle 2A switches the communication means between terrestrial communication and satellite communication, by using a large detection range under the assumption that there will be a time period during which the first flying vehicle 2A cannot communicate, the flight management system S can reduce an occurrence of situations in which it cannot be detected that a flying vehicle and another flying vehicle are coming near to each other.

[Configuration of Flight Management System S]

Figure 2:
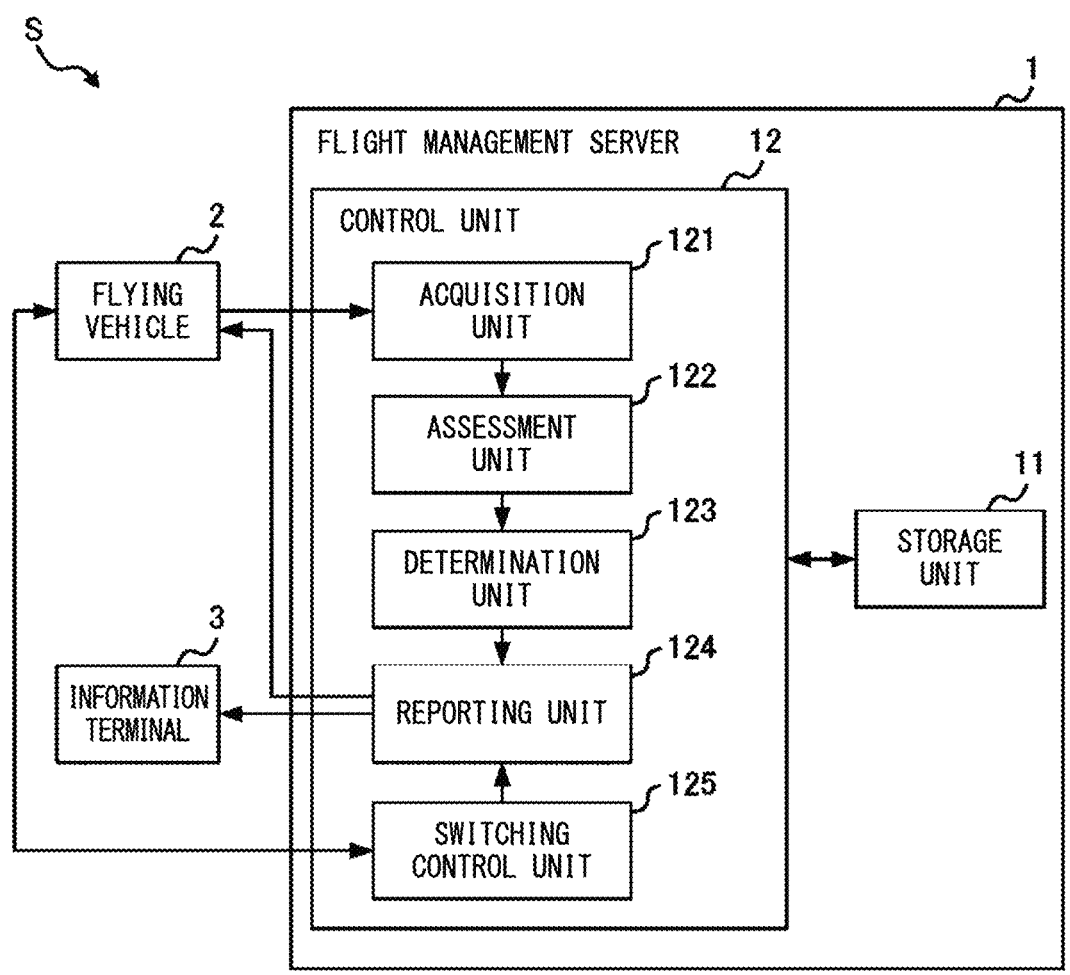
FIG. 2 is a block diagram of a flying vehicle management system according to the present embodiment.

FIG. 2 is a block diagram of a flight management system S according to the present embodiment. In FIG. 2, the arrows indicate the main data flow, and there may be data flow other than that indicated in FIG. 2. In FIG. 2, the respective blocks indicate functional unit configurations rather than hardware (apparatus) unit configurations. For this reason, the blocks indicated in FIG. 2 may be installed in a single apparatus, or may be installed so as to be divided between multiple apparatuses. The exchange of data between the blocks may be performed by any means, such as by a data bus, a network, a portable storage medium, etc.

The flight management server 1 has a storage unit 11 and a control unit 12. The storage unit 11 is a storage medium including a ROM (Read-Only Memory), a RAM (Random Access Memory), a hard disk drive, etc. The storage unit 11 prestores a program to be executed by the control unit 12. The storage unit 11 may be provided outside the flight management server 1, and in that case, may exchange data with the control unit 12 via a network.

The control unit 12 has an acquisition unit 121, an assessment unit 122, a determination unit 123, a reporting unit 124, and a switching control unit 125. The control unit 12 is a processor such as, for example, a CPU (Central Processing Unit), that functions as the acquisition unit 121, the assessment unit 122, the determination unit 123, the reporting unit 124, and the switching control unit 125 by executing a program stored in the storage unit 11. At least some of the functions of the control unit 12 may be executed by an electrical circuit. Additionally, at least some of the functions of the control unit 12 may be realized by the control unit 12 executing a program that is executed via a network.

Hereinafter, the process executed by the flight management system S will be explained in detail. Each of the multiple flying vehicles 2 identifies its own position by using, for example, GNSS (Global Navigation Satellite System), and transmits position information indicating the identified position to the flight management server 1 by terrestrial communication or by satellite communication. Additionally, each of the multiple flying vehicles 2 transmits, to the flight management server 1, by means of terrestrial communication or satellite communication, communication information indicating which communication means, of terrestrial communication or satellite communication, is being used, and the radio signal strength of communication signals that are being received.

In the flight management server 1, the acquisition unit 121 acquires the position information and the communication information transmitted by each of the multiple flying vehicles 2, and stores said information in the storage unit 11 in association with a flying vehicle ID (Identification) for identifying the flying vehicle 2 that is the transmission source. Additionally, the acquisition unit 121 may acquire position information from another apparatus holding the position information of the flying vehicles 2. Hereinafter, among the multiple flying vehicles 2 that are in flight, one of the flying vehicles 2 will be referred to as a first flying vehicle 2A, and a flying vehicle 2 different from the first flying vehicle 2A will be referred to as a second flying vehicle 2B. The first flying vehicle 2A may be each of the multiple flying vehicles 2 that are flying, or may be any one of the flying vehicles 2 designated by the user.

The assessment unit 122 assesses, based on the information acquired by the acquisition unit 121, whether or not there is a possibility that a requirement to switch the communication performed by the first flying vehicle 2A during flight between terrestrial communication and satellite communication arises. The assessment unit 122 assesses whether or not there is the possibility that a requirement to switch between terrestrial communication and satellite communication arises, based on the radio signal strength at the position of the first flying vehicle 2A indicated by a radio signal map or the radio signal strength of communication signals received by the first flying vehicle 2A.

Figure 3:
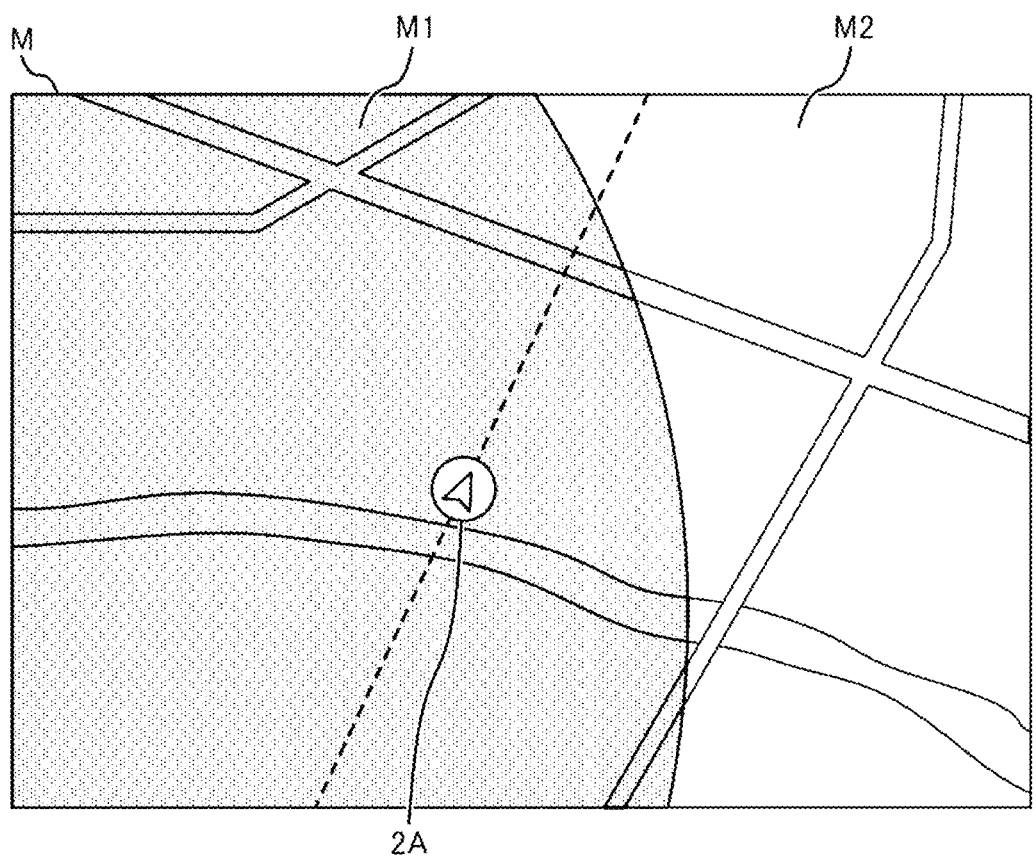
FIG. 3 is a schematic diagram for explaining a method for an assessment unit to make an assessment based on radio signal strengths indicated on a radio signal map.

FIG. 3 is a schematic diagram for explaining the method by which the assessment unit 122 makes an assessment based on the radio signal strength indicated by a radio signal map. The assessment unit 122 assesses whether or not there will be a requirement to switch between terrestrial communication and satellite communication based on whether or not the position of the first flying vehicle 2A indicated by the position information acquired by the acquisition unit 121 is within a region in which the radio signal strength of terrestrial communication signals on the radio signal map is in a prescribed range.

The assessment unit 122, for example, acquires a radio signal map M that is prestored in the storage unit 11. The radio signal map M is information indicating the radio signal strengths of terrestrial communication signals at positions in the sky. The radio signal map M may indicate the radio signal strengths at positions on a plane (for example, two-dimensional coordinates), or may indicate radio signal strengths at positions in space (for example, three-dimensional coordinates). The radio signal map M is generated, for example, by simulating the radio signal strengths of communication signals at positions in the sky, or by actually measuring the radio signal strengths of communication signals at positions in the sky.

FIG. 3 schematically indicates, on a geographical map, an exemplary radio signal map M acquired by the assessment unit 122. Additionally, FIG. 3 schematically indicates, on the geographical map, the position of the first flying vehicle 2A (the icon image in FIG. 3) and the scheduled flight path (the dashed line in FIG. 3). The radio signal map M includes a first region M1 in which the radio signal strength of terrestrial communication signals is within a prescribed range, and a second region M2 in which the radio signal strength of terrestrial communication signals is not within a prescribed range. For example, the first region M1 is a region in which the radio signal strength is equal to or higher than a prescribed threshold value, and the second region M2 is a region in which the radio signal strength is lower than a prescribed threshold value. The signal strength threshold values are prestored in the storage unit 11.

The first flying vehicle 2A performing terrestrial communication, for example, while located in the first region M1, can stably maintain terrestrial communication because the radio signal strength of terrestrial communication signals is high. On the other hand, for example, while located in the second region M2, there will be cases in which the first flying vehicle 2A performing terrestrial communication will be unable to maintain terrestrial communication because the radio signal strength of terrestrial communication signals is low, so that it may be required to switch from terrestrial communication to satellite communication.

Thus, the assessment unit 122, for example, assesses that there will be no requirement to switch from terrestrial communication to satellite communication in the case in which the position of the first flying vehicle 2A performing terrestrial communication is in the first region M1, and assesses that there will be a requirement to switch from terrestrial communication to satellite communication in the case in which the position of the first flying vehicle 2A performing terrestrial communication is not in the first region M1.

The first flying vehicle 2A performing satellite communication, for example, while located in the second region M2, cannot easily switch from satellite communication to terrestrial communication because the radio signal strength of the terrestrial communication signals is low. However, for example, while located in the first region M1, the first flying vehicle 2A performing satellite communication can easily switch from satellite communication to terrestrial communication because the radio signal strength of the terrestrial communication signals is high. In general, the communication cost of satellite communication is higher than the communication cost of terrestrial communication. Therefore, in situations in which satellite communication can be switched to terrestrial communication, it is preferable to switch to terrestrial communication.

Therefore, the assessment unit 122, for example, assesses that there will be a requirement to switch from satellite communication to terrestrial communication in the case in which the position of the first flying vehicle 2A performing satellite communication is within the first region M1, and assesses that there will not be a requirement to switch from satellite communication to terrestrial communication in the case in which the position of the first flying vehicle 2A performing satellite communication is not within the first region M1.

Figure 4:
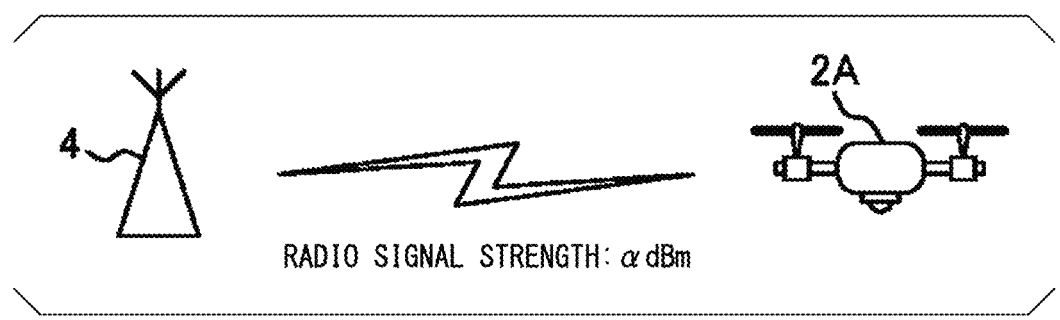
FIG. 4 is a schematic diagram for explaining a method for the assessment unit to make an assessment based on a radio signal strength of communication signals received by a first flying vehicle.

FIG. 4 is a schematic view for explaining a method by which the assessment unit 122 makes an assessment based on the radio signal strength of communication signals received by the first flying vehicle 2A. The assessment unit 122 assesses whether or not there will be a requirement to switch between terrestrial communication and satellite communication based on the relationship between a prescribed threshold value and the radio signal strength of terrestrial communication signals received by the first flying vehicle 2A, indicated by the communication information acquired by the acquisition unit 121. The threshold value of the radio signal strength is prestored in the storage unit 11.

The assessment unit 122, for example, assesses that there will be no requirement to switch from terrestrial communication to satellite communication in the case in which the radio signal strength of terrestrial communication signals received by the first flying vehicle 2A performing terrestrial communication is equal to or higher than a threshold value, and assesses that there will be a requirement to switch from terrestrial communication to satellite communication in the case in which the radio signal strength of terrestrial communication signals received by the first flying vehicle 2A performing terrestrial communication is lower than the threshold value.

Additionally, the assessment unit 122, for example, assesses that there will be a requirement to switch from satellite communication to terrestrial communication in the case in which the radio signal strength of terrestrial communication signals received by the first flying vehicle 2A performing satellite communication is equal to or higher than a threshold value, and assesses that there will be no requirement to switch from satellite communication to terrestrial communication in the case in which the radio signal strength of terrestrial communication signals received by the first flying vehicle 2A performing satellite communication is lower than the threshold value.

The assessment unit 122 may assess whether or not there will be a requirement to switch between terrestrial communication and satellite communication by using different threshold values between the case of switching from terrestrial communication to satellite communication and the case of switching from satellite communication to terrestrial communication. For example, the threshold value of the radio signal strength of terrestrial communication signals in the case of switching from satellite communication to terrestrial communication is higher than the threshold value of the radio signal strength of terrestrial communication signals in the case of switching from terrestrial communication to satellite communication. Thus, frequent changes in the assessment results by the assessment unit 122 in the vicinity of the threshold values of the radio signal strength can be suppressed, and the frequency by which the determination unit 123, to be described below, changes the detection range can be suppressed.

The determination unit 123 determines a detection range for providing a report in response to the detection of a second flying vehicle 2B different from the first flying vehicle 2A, the detection range being defined with respect to the position of the first flying vehicle 2A. In this case, the determination unit 123 makes the detection range for the case in which the assessment unit 122 has assessed that there will be a requirement to switch between terrestrial communication and satellite communication larger than the detection range (also referred to as the normal detection range) for the case in which the assessment unit 122 has assessed that there will be no requirement to switch between terrestrial communication and satellite communication.

Figure 5:
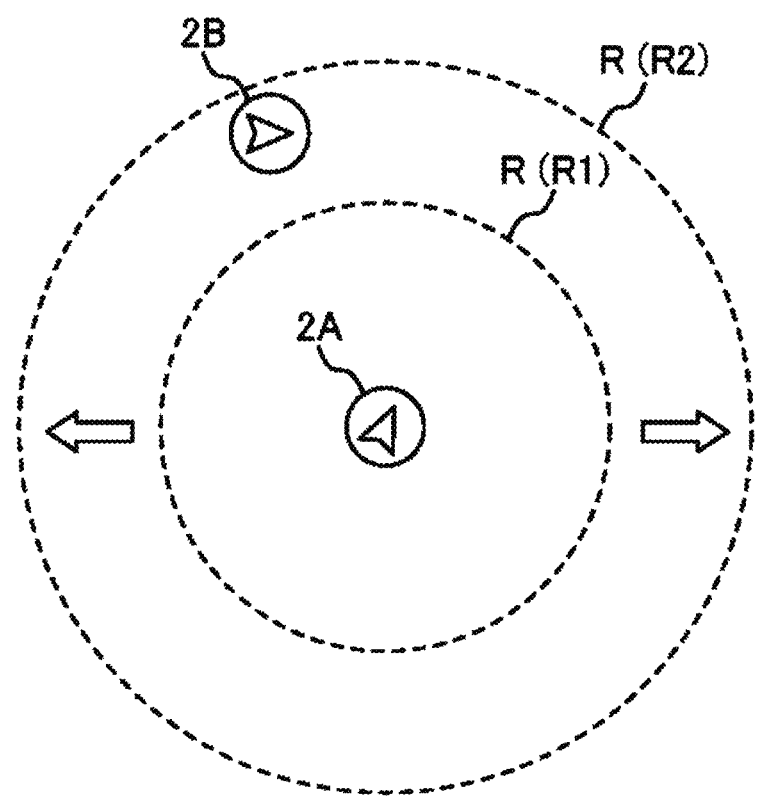
FIG. 5 is a schematic diagram for explaining a method for a determination unit to determine a detection range.

FIG. 5 is a schematic diagram for explaining the method by which the determination unit 123 determines the detection range R. The determination unit 123, for example, sets the detection range R1 to be a range within a first distance from the position of the first flying vehicle 2A in the case in which the assessment unit 122 has assessed that there will be no requirement to switch between terrestrial communication and satellite communication, and sets the detection range to be a range within a second distance, greater than the first distance, from the position of the first flying vehicle 2A when the assessment unit 122 has assessed that there will be a requirement to switch between terrestrial communication and satellite communication. The first distance and the second distance are, for example, prestored in the storage unit 11.

In this way, the flight management system S can prevent situations in which it cannot be detected that the first flying vehicle 2A and the second flying vehicle 2B are coming near to each other in the case in which there may be a time period during which the first flying vehicle 2A cannot communicate due to switching the communication means between terrestrial communication and satellite communication.

Additionally, the determination unit 123 may change, as time elapses, the detection range for the case in which the assessment unit 122 has assessed that there will be a requirement to switch between terrestrial communication and satellite communication. In this case, the determination unit 123, for example, makes the detection range (second distance) larger as the elapsed time from the time at which the assessment unit 122 assessed that there is a requirement to switch between terrestrial communication and satellite communication until the current time becomes longer. In this way, the flight management system S can more reliably reduce an occurrence of situations in which it cannot be detected that the first flying vehicle 2A and the second flying vehicle 2B are coming near to each other, even when the range of possible in which the first flying vehicle 2A may be positioned becomes larger due to time having elapsed after the requirement to switch between terrestrial communication and satellite communication arose.

The reporting unit 124 uses the detection range determined by the determination unit 123 to detect whether the first flying vehicle 2A and the second flying vehicle 2B are approaching near to each other. The reporting unit 124, for example, detects that the first flying vehicle 2A and the second flying vehicle 2B are approaching near to each other in the case in which, based on the position information acquired by the acquisition unit 121, the second flying vehicle 2B is positioned within a detection range that is defined with respect to the first flying vehicle 2A, and does not detect that the first flying vehicle 2A and the second flying vehicle 2B are approaching near to each other when the above is not the case.

The detection unit 124 notifies that the second flying vehicle 2B is approaching near to the first flying vehicle 2A on the condition that it has been detected that the second flying vehicle 2B is positioned within the detection range that is defined with respect to the first flying vehicle 2A. The reporting unit 124, for example, notified that the second flying vehicle 2B is approaching near to the first flying vehicle 2A by transmitting prescribed information to the information terminal 3 or the second flying vehicle 2B via the terrestrial communication or the satellite communication.

Figure 6:
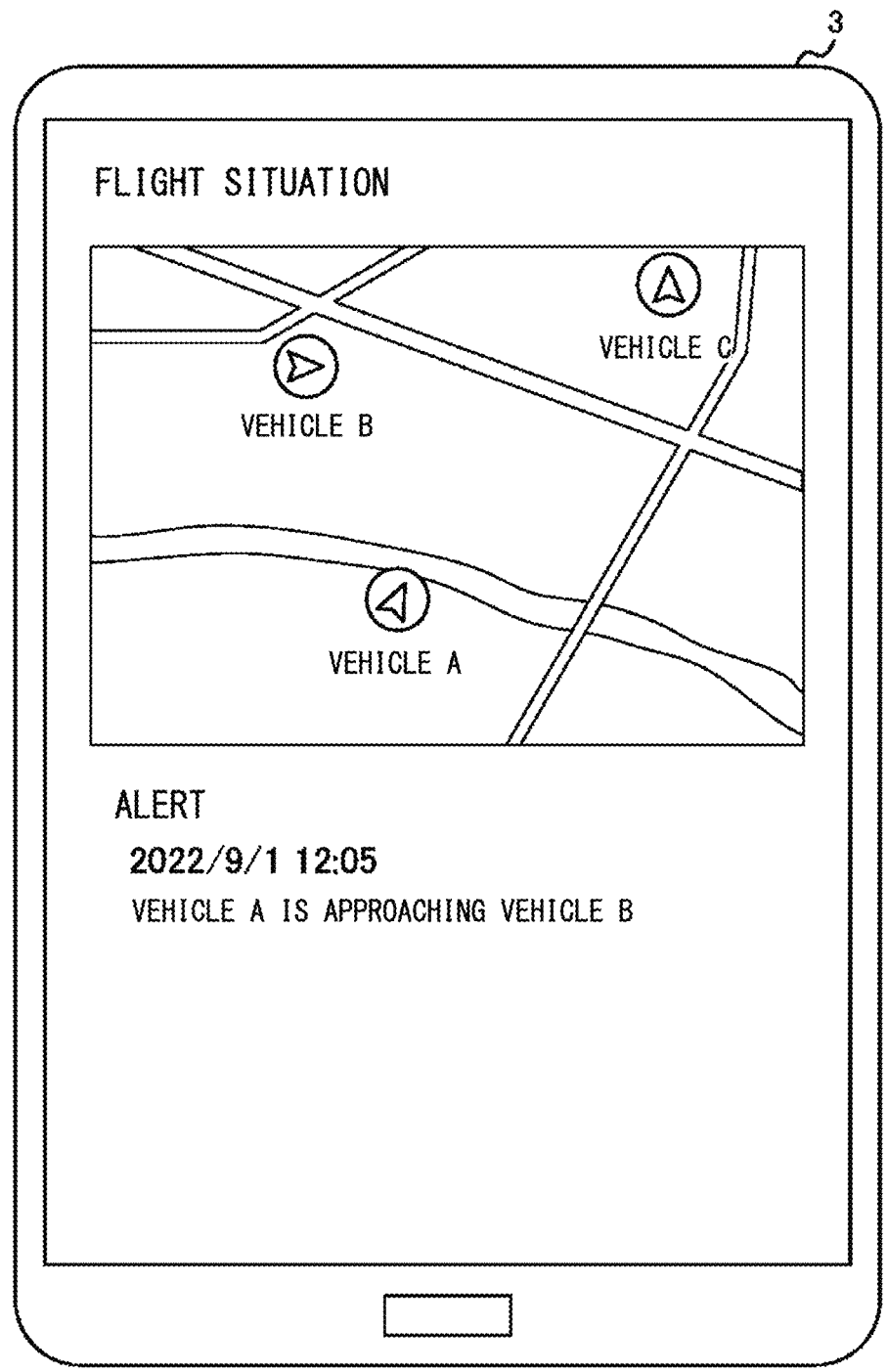
FIG. 6 is a schematic diagram for explaining a method for a reporting unit to provide a report to an information terminal

FIG. 6 is a schematic diagram for explaining the method by which the reporting unit 124 provides a report to the information terminal 3. On the condition that the second flying vehicle 2B has been detected to be positioned within the detection range that is defined with respect to the first flying vehicle 2A, the reporting unit 124 transmits, to the information terminal 3 used by the user associated with the second flying vehicle 2B, notification information indicating that the first flying vehicle 2A and the second flying vehicle 2B are approaching near to each other. The user using the information terminal 3 is, for example, a manual operator of the second flying vehicle 2B or a manager managing the flight of the second flying vehicle 2B.

The notification information includes, for example, a message indicating that the first flying vehicle 2A and the second flying vehicle 2B are approaching near to each other, and the date and time at which the second flying vehicle 2B was detected to be positioned within the detection range that is defined with respect to the first flying vehicle 2A. Additionally, the notification information may include position information for each of the multiple flying vehicles. The information terminal 3 displays the notification information received from the flight management server 1 on a display unit, as in FIG. 6.

As a result thereof, the flight management system S can notify the user associated with the second flying vehicle 2B that the first flying vehicle 2A and the second flying vehicle 2B are approaching near to each other, and the user can more easily take measures to keep the first flying vehicle 2A and the second flying vehicle 2B from coming into contact.

Figure 7:
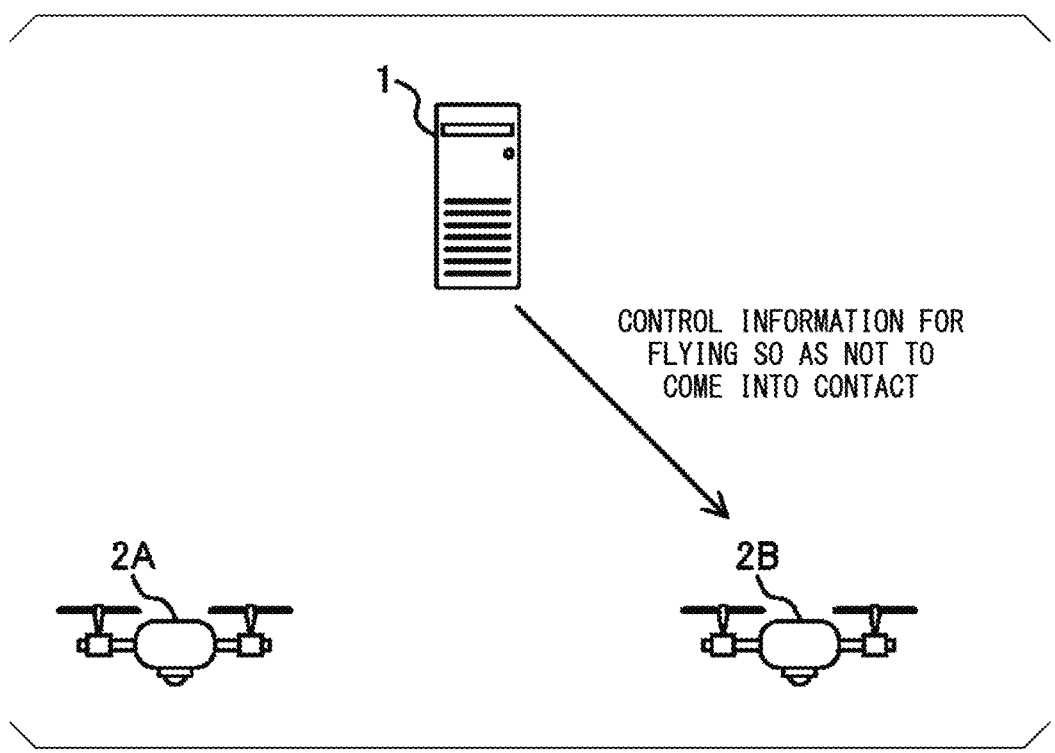
FIG. 7 is a schematic diagram for explaining a method for the reporting unit to provide a report to a second flying vehicle.

FIG. 7 is a schematic diagram for explaining the method by which the reporting unit 124 provides a report to the second flying vehicle 2B. On the condition that the second flying vehicle 2B has been detected to be positioned within the detection range that is defined with respect to the first flying vehicle 2A, the reporting unit 124 transmits, to the second flying vehicle 2B, control information for making the second flying vehicle 2B fly so as not to come into contact with the first flying vehicle 2A.

The control information is, for example, information for making the second flying vehicle 2B fly in a direction away from the first flying vehicle 2A, information for making the second flying vehicle 2B stop (hover, land, etc.), or information for changing the flight path of the second flying vehicle 2B so as not to come into contact with the first flying vehicle 2A. The second flying vehicle 2B flies or stops in accordance with the control information received from the flight management server 1.

Thus, the flight management system S can transmit control information to the second flying vehicle 2B in response to the first flying vehicle 2A and the second flying vehicle 2B approaching near to each other, and can control the second flying vehicle 2B so as not to come into contact with the first flying vehicle 2A without depending on a manual operation by the user.

The switching control unit 125 controls switching of the communication performed by the first flying vehicle 2A between terrestrial communication and satellite communication on the condition that the relationship between a threshold value and the radio signal strength of the terrestrial communication signals satisfies a switching criterion. The switching control unit 125, for example, controls switching of the communication performed by the first flying vehicle 2A between terrestrial communication and satellite communication, by transmitting to the first flying vehicle 2A, by terrestrial communication or satellite communication, control information for switching the communication means between terrestrial communication and satellite communication. The first flying vehicle 2A switches the communication means between terrestrial communication and satellite communication in accordance with the control information received from the flight management server 1. The threshold value of the radio signal strength of the terrestrial communication signals is, for example, prestored in the storage unit 11.

The switching control unit 125 controls switching of the communication performed by the first flying vehicle 2A from terrestrial communication to satellite communication on the condition that, for example, the radio signal strength of the terrestrial communication signals received by the first flying vehicle 2A performing terrestrial communication is equal to or lower than a threshold value. The switching control unit 125 controls switching of the communication performed by the flying vehicle 2A from satellite communication to terrestrial communication on the condition that, for example, the radio signal strength of the terrestrial communication signals received by the first flying vehicle 2A performing satellite communication is equal to or higher than a threshold value.

Additionally, the switching control unit 125 may switch the communication performed by the first flying vehicle 2A from terrestrial communication to satellite communication on the condition that, for example, the radio signal strength of the terrestrial communication signals on a radio signal map at the position of the first flying vehicle 2A performing terrestrial communication is equal to or lower than a threshold value. Additionally, the switching control unit 125 may switch the communication performed by the first flying vehicle 2A from satellite communication to terrestrial communication on the condition that, for example, the radio signal strength of the terrestrial communication signals on a radio signal map at the position of the first flying vehicle 2A performing satellite communication is equal to or higher than a threshold value.

Thus, the flight management system S can automatically switch the communication performed by the first flying vehicle 2A between terrestrial communication and satellite communication in accordance with the signal strength of the terrestrial communication signals received by the first flying vehicle 2A.

Additionally, the switching control unit 125 may switch the communication performed by the first flying vehicle 2A between terrestrial communication and satellite communication based on the radio signal strength of the satellite communication signals in addition to the radio signal strength of the terrestrial communication signals. Threshold values for the radio signal strengths of the signals, respectively, for terrestrial communication and satellite communication are, for example, prestored in the storage unit 11.

The switching control unit 125, for example, controls switching of the communication performed by the first flying vehicle 2A from terrestrial communication to satellite communication on the condition that, for example, the radio signal strength of the terrestrial communication signals received by the first flying vehicle 2A performing terrestrial communication is equal to or lower than a threshold value, and the radio signal strength of the satellite communication signals received by the first flying vehicle 2A is equal to or higher than a threshold value. Additionally, the switching control unit 125 controls switching of the communication performed by the first flying vehicle 2A from satellite communication to terrestrial communication on the condition that, for example, the radio signal strength of the terrestrial communication signals received by the first flying vehicle 2A performing satellite communication is equal to or higher than a threshold value, and the radio signal strength of the satellite communication signals received by the first flying vehicle 2A is equal to or lower than a threshold value.

Additionally, the switching control unit 125 may switch the communication performed by the first flying vehicle 2A from terrestrial communication to satellite communication on the condition that, for example, the radio signal strength of the terrestrial communication signals on a radio signal map at the position of the first flying vehicle 2A performing terrestrial communication is equal to or lower than a threshold value, and the radio signal strength of the satellite communication signals on a radio signal map at the position of the first flying vehicle 2A is equal to or higher than a threshold value. Additionally, the switching control unit 125 may switch the communication performed by the first flying vehicle 2A from satellite communication to terrestrial communication on the condition that, for example, the radio signal strength of the terrestrial communication signals on a radio signal map at the position of the first flying vehicle 2A performing satellite communication is equal to or higher than a threshold value, and the radio signal strength of the satellite communication signals on a radio signal map at the position of the first flying vehicle 2A is equal to or lower than a threshold value.

In this way, the flight management system S can automatically switch the communication performed by the first flying vehicle 2A between terrestrial communication and satellite communication in accordance with the radio signal strengths of signals for terrestrial communication and satellite communication received by the first flying vehicle 2A.

The determination unit 123, after making the detection range (the detection range R2 in FIG. 5) larger in response to the assessment unit 122 making an assessment that there will be a requirement to switch between terrestrial communication and satellite communication, may return the detection range (the detection range R1 in FIG. 5) to that for the case in which it has been assessed that there will be no requirement to switch between terrestrial communication and satellite communication in response to the switching control unit 125 having switched the communication performed by the first flying vehicle 2A between terrestrial communication and satellite communication. Thus, the flight management system S can return the detection range to the original range after the switching of the communication performed by the first flying vehicle 2A has been completed, thereby preventing reports from being made unnecessarily.

The reporting unit 124 may transmit notification information indicating that the communication performed by the first flying vehicle 2A has been switched between terrestrial communication and satellite communication to the information terminal 3 used by the user associated with the first flying vehicle 2A in response to the communication performed by the first flying vehicle 2A having between switched between terrestrial communication and satellite communication by the switching control unit 125. The user using the information terminal 3 is, for example, a manual operator of the first flying vehicle 2A, or a manager managing the flight of the first flying vehicle 2A.

The notification information includes, for example, a message indicating that the communication performed by the first flying vehicle 2A has been switched from terrestrial communication to satellite communication or has been switched from satellite communication to terrestrial communication. The information terminal 3 displays the notification information received from the flight management server 1 on the display unit.

In this way, the flight management system S can notify the user associated with the first flying vehicle 2A that the communication means of the first flying vehicle 2A has been switched, thereby allowing the user to easily be made aware of the current communication means of the first flying vehicle 2A.

[Flow of Information Processing Method]

Figure 8:
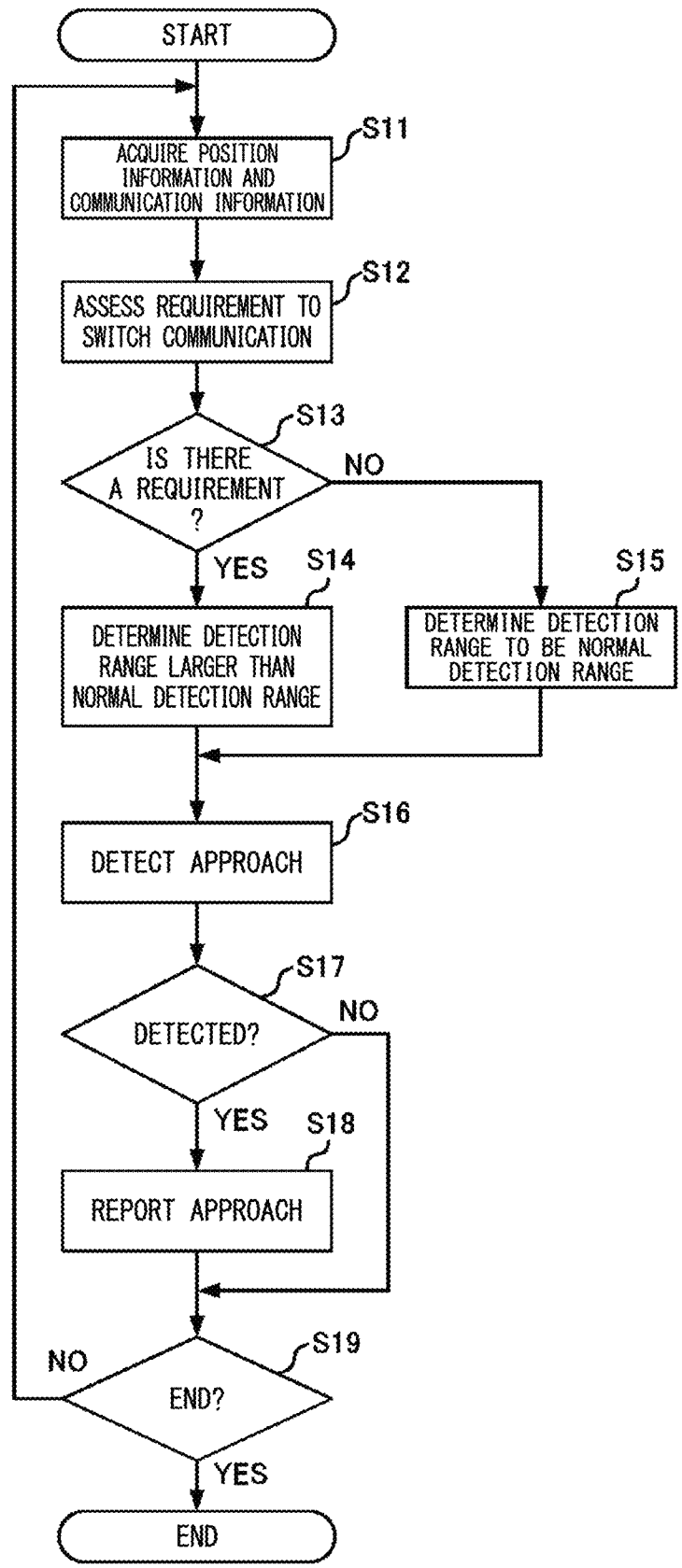
FIG. 8 is a diagram indicating a flow chart for an information processing method executed by a flight management server according to an embodiment.

FIG. 8 is a diagram depicting a flow chart for the information processing method executed by the flight management server 1 according to the present embodiment. In the flight management server 1, the acquisition unit 121 acquires position information and communication information transmitted from each of multiple flying vehicles 2 and stores the information in the storage unit 11 so as to be associated with flying vehicle IDs for identifying the flying vehicles 2 that are the transmission sources (S11). The flight management server 1 performs the subsequent processes with each of the multiple flying vehicles 2 as the first flying vehicle 2A or with one of the flying vehicles 2 designated by the user as the first flying vehicle 2A.

The assessment unit 122 assesses, based on the information acquired by the acquisition unit 121, whether or not there is a possibility that a requirement to switch the communication performed by the first flying vehicle 2A during flight between terrestrial communication and satellite communication arises (S12). The assessment unit 122, for example, assesses whether or not there is the possibility that a requirement to switch between terrestrial communication and satellite communication arises, based on the radio signal strength at the position of the first flying vehicle 2A indicated on a radio signal map or the radio signal strength of communication signals received by the first flying vehicle 2A.

In the case in which the assessment unit 122 has assessed that there is a possibility that a requirement to switch between terrestrial communication and satellite communication arises (YES in S13), the determination unit 123 determines a detection range that is larger than the detection range (normal detection range) for the case in which the assessment unit 122 has assessed that there is no possibility that requirement to switch between terrestrial communication and satellite communication arises (S14). On the other hand, in the case in which the assessment unit 122 has assessed that there is no possibility that requirement to switch between terrestrial communication and satellite communication arises (NO in S13), the determination unit 123 determines that the detection range is to be the normal detection range (S15).

The reporting unit 124 uses the detection range determined by the determination unit 123 to detect that the first flying vehicle 2A and the second flying vehicle 2B are approaching near to each other (S16). The reporting unit 124, for example, detects that the flying vehicle 2A and the flying vehicle 2B are approaching near to each other if, based on the position information acquired by the acquisition unit 121, the second flying vehicle 2B is positioned within the detection range that is defined with respect to the first flying vehicle 2A, and if not, does not detect that the flying vehicle 2A and the flying vehicle 2B are approaching near to each other.

In the case in which the reporting unit 124 has not detected that the second flying vehicle 2B is positioned within the detection range that is defined with respect to the first flying vehicle 2A (NO in S17), the flight management server 1 advances to step S19.

In the case in which the reporting unit 124 has detected that the second flying vehicle 2B is positioned within the detection range that is defined with respect to the first flying vehicle 2A (YES in S17), it is notified that the second flying vehicle 2B is approaching the first flying vehicle 2A (S18). The reporting unit 124, for example, notifies that the second flying vehicle 2B is approaching the first flying vehicle 2A by transmitting prescribed information to the information terminal 3 or the second flying vehicle 2B by terrestrial communication or satellite communication.

In the case in which prescribed ending conditions (for example, the user having performed a manual ending operation) are not satisfied (NO in S19), the flight management server 1 repeats steps S11 to S18. In the case in which the prescribed ending conditions have been satisfied (YES in S19), the flight management server 1 ends the process.

Effects of Embodiments

If there is a time period during which the first flying vehicle 2A cannot communicate while switching the communication means between terrestrial communication and satellite communication, then there is a possibility of not being able to detect that the first flying vehicle 2A and the second flying vehicle 2B are coming near to each other during that time period. The flight management system S according to the present embodiment makes the detection range for detecting that the first flying vehicle 2A and the second flying vehicle 2B are approaching near to each other larger in the case in which there will be a requirement to switch the communication performed by the first flying vehicle 2A between terrestrial communication and satellite communication. Thus, the flight management system S can reduce an occurrence of situations in which the first flying vehicle 2A and the second flying vehicle 2B come near to each other, even when the first flying vehicle 2A is switching communication means between terrestrial communication and satellite communication, by using a large detection range assuming that there will be a time period during which the first flying vehicle 2A will not be able to communicate.

First Modified Example

In the embodiments described above, the flight management server 1 functions as an information processing apparatus that performs processes for reporting that two flying vehicles 2 are approaching near to each other. In the present modified example, one of the multiple flying vehicles 2 functions as an information processing apparatus that performs processes for reporting that two flying vehicles 2 are approaching near to each other.

In this case, processors in the flying vehicles 2 function, for example, as an acquisition unit 121, an assessment unit 122, a determination unit 123, a reporting unit 124, and a switching control unit 125. In the flying vehicles 2, the reporting unit 124 reports that the second flying vehicle 2B is approaching the first flying vehicle 2A based on the detection range determined by the determination unit 123, and thereafter, the switching control unit 125 commences control for switching the communication performed by the first flying vehicle 2A between terrestrial communication and satellite communication. According to the flight management system S in the present modified example, even in the case in which there is no flight management server 1, one of the flying vehicles 2 can perform a process for reporting that two flying vehicles 2 are approaching each other.

Second Modified Example

In the embodiments described above, the flight management server 1 functions as an information processing apparatus that performs processes for reporting that two flying vehicles 2 are approaching near to each other. In the present modified example, the flight management server 1 and a flying vehicle 2 cooperate to function as an information processing apparatus that performs processes for reporting that two flying vehicles 2 are approaching near to each other.

In this case, for example, processors in the flying vehicles 2 function as an acquisition unit 121, an assessment unit 122, and a switching control unit 125, and a processor in the flight management server 1 functions as a determination unit 123 and a reporting unit 124. In the flight management server 1, the reporting unit 124 reports that the second flying vehicle 2B is approaching the first flying vehicle 2A based on the detection range determined by the determination unit 123, and thereafter, in a flying vehicle 2, the switching control unit 125 commences control for switching the communication performed by the first flying vehicle 2A between terrestrial communication and satellite communication. According to the flight management system S in the present modified example, there is no need to transmit and receive, between the flight management server 1 and the flying vehicle 2, information for assessing whether or not there will be a requirement to switch the communication performed by the flying vehicle 2. Thus, the communication cost can be reduced.

Due to the present embodiments, it is possible to contribute to Goal 9, "Build resilient infrastructure, promote sustainable industrialization, and foster innovation" among the sustainable development goals (SDGs) advanced by the United Nations.

As mentioned above, several features are proposed in connection with an information processing apparatus and an information processing method for processing information regarding flying vehicles.

The flying vehicles fly while transmitting and receiving information to and from a server by means of communication. In order to enable communication over a large geographical area, flying vehicles that can selectively perform terrestrial communication making use of terrestrial communication equipment and satellite communication making use of communication satellites have been developed. However, there are cases in which a time period of a few seconds to several tens of seconds is required when a flying vehicle switches the communication means between terrestrial communication and satellite communication, and during that time period, the flying vehicle is not able to communicate. With the method described in Patent Document 1, since the position of the flying vehicle is acquired by communication, there is a possibility of not being able to detect that the flying vehicle is coming near to another flying vehicle under circumstances in which the flying vehicle cannot communicate.

At least one exemplary embodiment, for example, provides the effect of being able to reduce an occurrence of situations in which it cannot be detected that a flying vehicle is coming near to another flying vehicle, even in cases in which the flying vehicle is switching the communication means between terrestrial communication and satellite communication.

Although the present embodiment has been explained above, the technical scope is not limited to what is described regarding the embodiments above, and various modifications and changes are possible within the scope thereof. For example, all or some of the apparatuses may be configured in a functionally or physically distributed or integrated manner, in arbitrary units. Additionally, new embodiments obtained by arbitrarily combining multiple embodiments are also included among the present embodiments. The effects of the new embodiments obtained by combination are a combination of the effects of the original embodiments.

The processors in the flight management server 1, the flying vehicles 2, and the information terminal 3 execute the steps (processes) included in the information processing method indicated in FIG. 8. The processors in the flight management server 1, the flying vehicles 2, and the information terminal 3, for example, execute the information processing method indicated in FIG. 8 by executing a program for executing the information processing method indicated in FIG. 8. Some of the steps included in the information processing method indicated in FIG. 8 may be omitted, the order of the steps may be changed, and multiple steps may be performed simultaneously.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing apparatus comprising:
at least one memory configured to store instructions; and
at least one processor configured to execute the instructions to:
assess whether or not there will be a requirement to switch communication performed by a first flying vehicle during flight between terrestrial communication using terrestrial communication equipment and satellite communication using a communication satellite, based on a relationship between a threshold value and a radio signal strength of signals for the terrestrial communication received by the first flying vehicle;
acquire position information of the first flying vehicle and a second flying vehicle that is different from the first flying vehicle;
acquire a first distance that is stored, and determine a detection range, which indicates a range within the first distance from a position of the first flying vehicle indicated by the position information; and
determine whether or not a position of the second flying vehicle indicated by the position information is within the detection range, and control the second flying vehicle to fly without coming into contact with the first flying vehicle by transmitting control information to the second flying vehicle, in a case where it is determined that the second flying vehicle is positioned within the detection range,
wherein the at least one processor is configured to execute the instructions to:
in assessing, assess that there will be the requirement to switch between the terrestrial communication and the satellite communication, in a case where the radio signal strength of signals for the terrestrial communication received by the first flying vehicle performing the terrestrial communication is less than the threshold value, or where the radio signal strength of signals for the terrestrial communication received by the first flying vehicle performing the satellite communication is greater than or equal to the threshold value, and
change the detection range to a range within a second distance, which is greater than the first distance, from the position of the first flying vehicle, in a case where it is assessed that there will be the requirement to switch between the terrestrial communication and the satellite communication.

2. The information processing apparatus according to claim 1, wherein
the at least one processor is configured to execute the instructions to:
in assessing, assess whether or not there will be the requirement to switch between the terrestrial communication and the satellite communication based on whether or not the position of the first flying vehicle is within a region in which the radio signal strength of signals for the terrestrial communication is within a prescribed range.

3. The information processing apparatus according to claim 1, wherein the at least one processor is configured to execute the instructions to:
transmit to an information terminal used by a user associated with the second flying vehicle, in a case where it is determined that the second flying vehicle is positioned within the detection range, information indicating that the first flying vehicle and the second flying vehicle are approaching near to each other.

4. The information processing apparatus according to claim 1, wherein the at least one processor is configured to execute the instructions to:
return, after having changed the detection range to the range within the second distance from the position of the first flying vehicle, the detection range to the range within the first distance from the position of the first flying vehicle, in a case where it assessed that there will be no requirement to switch between the terrestrial communication and the satellite communication in response to the communication performed by the first flying vehicle having been switched between the terrestrial communication and the satellite communication.

5. The information processing apparatus according to claim 1, wherein the at least one processor is further configured to execute the instructions to:
transmit, to an information terminal used by a user associated with the first flying vehicle, information indicating that the communication performed by the first flying vehicle has been switched between the terrestrial communication and the satellite communication, in a case where the communication performed by the first flying vehicle having been switched between the terrestrial communication and the satellite communication.

6. The information processing apparatus according to claim 1, wherein the at least one processor is configured to execute the instructions to:
in assessing, assess whether the relationship between the threshold value and the radio signal strength of signals for the terrestrial communication received by the first flying vehicle has satisfied a switching criterion, and
control switching of the communication performed by the first flying vehicle between the terrestrial communication and the satellite communication, in a case where it is assessed that the relationship has satisfied the switching criterion.

7. An information processing method, executed by a processor, the information processing method comprising:
assessing whether or not there will be a requirement to switch communication performed by a first flying vehicle during flight between terrestrial communication using terrestrial communication equipment and satellite communication using a communication satellite, based on a relationship between a threshold value and a radio signal strength of signals for the terrestrial communication received by the first flying vehicle;
acquiring position information of a first flying vehicle and a second flying vehicle that is different from the first flying vehicle;
acquiring a first distance that is stored, and determining a detection range, which indicates a range within the first distance from a position of the first flying vehicle indicated by the position information; and
determining whether or not a position of the second flying vehicle indicated by the position information is within the detection range, and controlling the second flying vehicle to fly without coming into contact with the first flying vehicle by transmitting control information to the second flying vehicle, in a case where it is determined that the second flying vehicle is positioned within the detection range,
wherein, in assessing, it is assessed that that there will be the requirement to switch between the terrestrial communication and the satellite communication, in a case where the radio signal strength of signals for the terrestrial communication received by the first flying vehicle performing the terrestrial communication is less than the threshold value, or where the radio signal strength of signals for the terrestrial communication received by the first flying vehicle performing the satellite communication is greater than or equal to the threshold value,
wherein the information processing method further includes,
changing the detection range to a range within a second distance, which is greater than the first distance, from the position of the first flying vehicle, in a case where it is assessed that there will be the requirement to switch between the terrestrial communication and the satellite communication in the assessing.

8. The information processing apparatus according to claim 1, wherein
wherein the at least one processor is configured to execute the instructions to:
in changing, the detection range is changed larger according to an elapsed time from a time when it is assessed that there will be the requirement to switch between the terrestrial communication and the satellite communication.

9. The information processing apparatus according to claim 1, wherein
wherein the at least one processor is configured to execute the instructions to:
in assessing,
assess that there will be the requirement to switch from the terrestrial communication to the satellite communication, in a case where the radio signal strength of signals for the terrestrial communication received by the first flying vehicle performing the terrestrial communication is less than a first threshold value, or
assess that there will be the requirement to switch the from satellite communication to the terrestrial communication, in a case where the radio signal strength of signals for the terrestrial communication received by the first flying vehicle performing the satellite communication is greater than or equal to a second threshold value, which is greater than the first threshold value.

* * * * *